No. 777,051. PATENTED DEC. 6, 1904.
W. M. UNDERHILL.
ANIMAL STALL.
APPLICATION FILED OCT. 9, 1903.
NO MODEL. 2 SHEETS—SHEET 1.
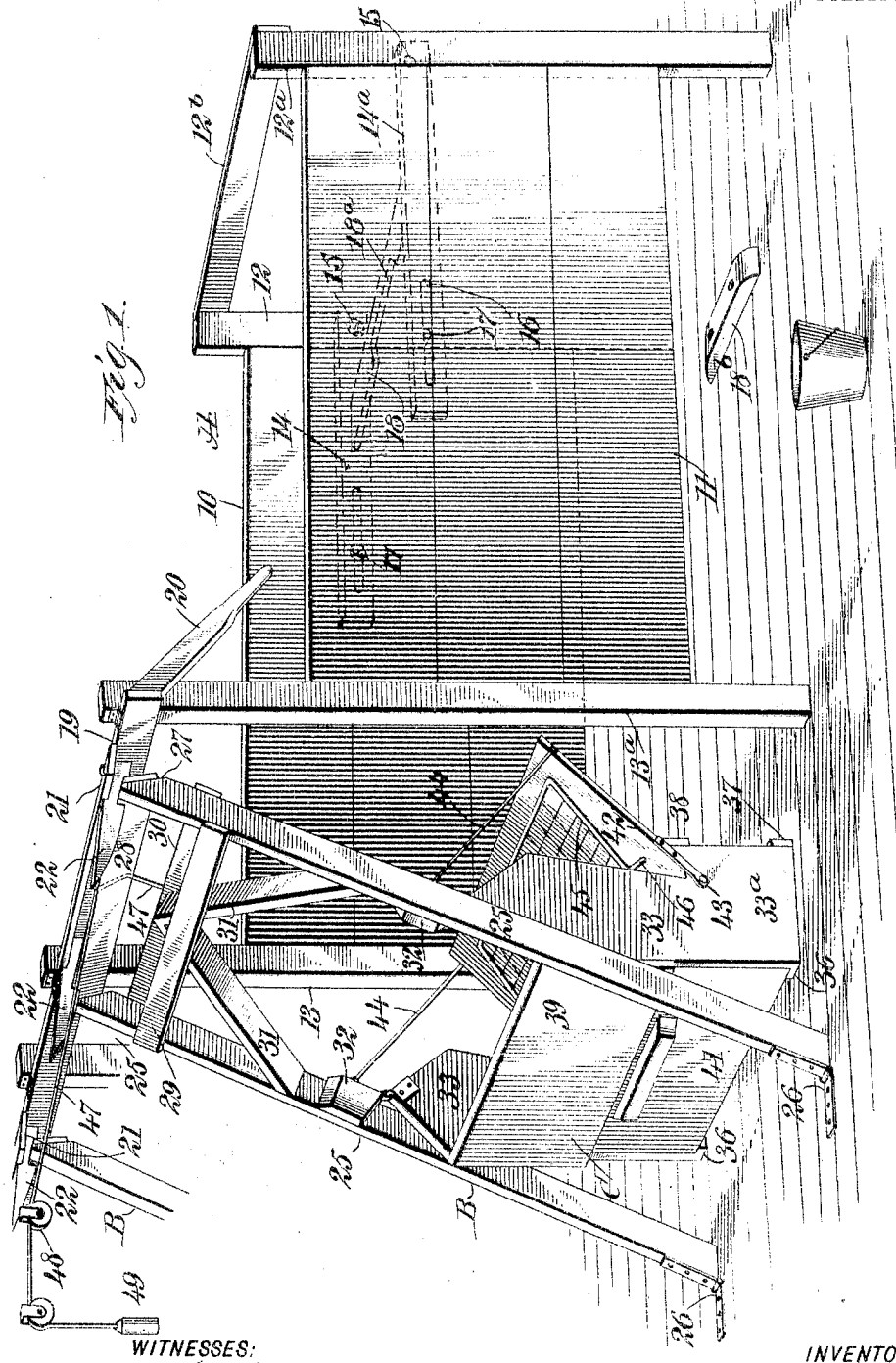
WITNESSES:
INVENTOR
William M. Underhill
BY
ATTORNEYS

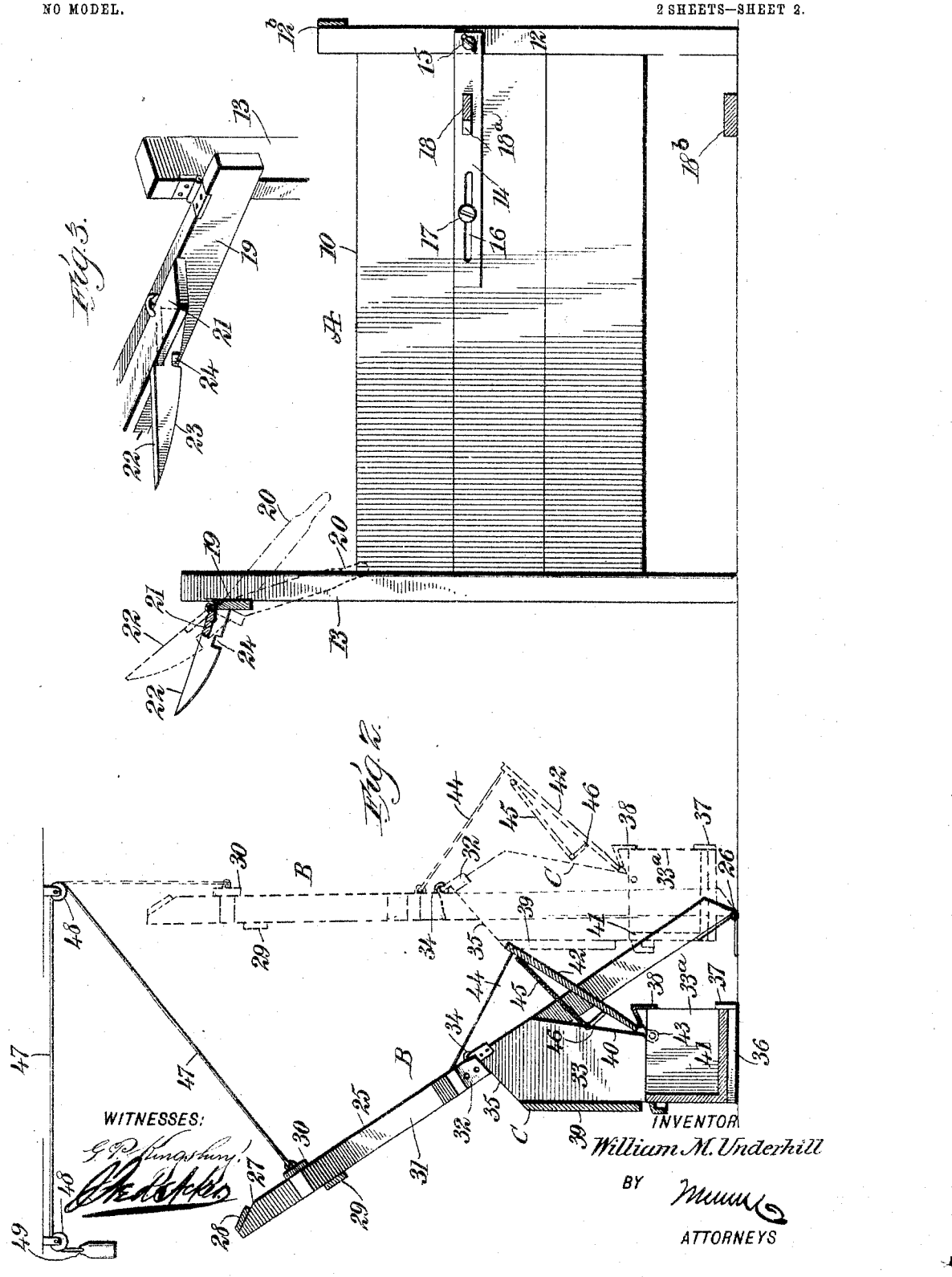

No. 777,051.                                                    Patented December 6, 1904.

UNITED STATES PATENT OFFICE.

WILLIAM MOTT UNDERHILL, OF OCONTO, WISCONSIN.

ANIMAL-STALL.

SPECIFICATION forming part of Letters Patent No. 777,051, dated December 6, 1904.

Application filed October 9, 1903. Serial No. 176,369. (No model.)

*To all whom it may concern:*

Be it known that I, WILLIAM MOTT UNDERHILL, a citizen of the United States, and a resident of Oconto, in the county of Oconto and State of Wisconsin, have invented a new and useful Improvement in Animal-Stalls, of which the following is a full, clear, and exact description.

My invention relates particularly to an improvement in cow-stalls arranged singly or in series.

The purpose of the invention is to economize in the cost of construction of such stalls and to provide each stall employed with an adjustable front bar placed far enough back to touch in front of the withers when the cow is eating from the floor or from a low manger and to touch the lower part of the throat when the head is above the bar, such cross-bar being also placed so far back as to render it necessary for the cow to swing her head to the right or the left crosswise of the stall when changing from one position to the other.

Another purpose of the invention is to provide a tilting frame for the rear of the stall capable of closing the same or of opening the stall to a greater or less extent for the entrance of the animal or the accommodation of the milker and to provide a counterbalance for the tilting frame, acting to assist in closing or opening it, but being likewise inactive when the frame is fully open or closed, and, furthermore, to provide latches for the tilting frame and means whereby the latches carried by each stall may be independently operated or whereby the latches of a series of stalls may be simultaneously operated.

Another purpose of the invention is to provide the tilting frame with a pivoted or swing receptacle for droppings, having a removable drawer to receive the same, and a chute-board so arranged that as the cow changes position forward or backward in the stall the chute-board while the stall is closed will always engage with the thighs of the animal and be carried therefrom when the stall is opened, and also to provide the chute-board with a guard for the tail of the animal adapted to keep the tail clean.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved stall closed. Fig. 2 is a vertical section through the tilting frame and the receptacle for droppings carried thereby, the said tilting frame being shown by positive lines in its full open position and in dotted lines in an intermediate position, said Fig. 2 being likewise a vertical longitudinal section through the body of the stall; and Fig. 3 is a detail perspective view of a portion of a latch device for a stall adapted for locking engagement with the upper portion of the tilting frame belonging to the stall.

A represents the body of the stall, which, as shown, consists of side sections 10 and 11, attached at their forward ends, respectively, to standards 12 and $12^a$, and these standards are preferably made to extend above the top edges of the side sections 10 and 11. The standards are connected at the top of the crossbar $12^b$ to strengthen the structure of the stall-body, and the said side sections 10 and 11 are respectively attached at their rear edges to longer standards 13 and $13^a$—that is to say, the said standards 13 and $13^a$ are preferably made to extend farther above the upper edges of the side sections 10 and 11 than the forward standards 12 and $12^a$.

Near the forward end of each side section 10 and 11 of the stall-body two horizontal arms 14 and $14^a$ are located, attached at their front ends to the standards 12 and $12^a$ by screws 15 or their equivalents, being provided at their rear ends with longitudinal slots 16, through which screws or bolts 17 are passed into the said side sections 10 and 11. A stop-bar 18 connects the arms 14 and $14^a$ near their forward ends, and the said stop-bar is provided with a central recess $18^a$ in its rear edge adapted to have a position under the cow's throat at certain times. When the screw 15 is backed up or loosened, the stop-bar can be moved forward or rearward or up or down, and the arms 14 and 14ª may be carried vertically upward or downward at any desired angle. Usually, however, the stop-bar 18 occupies the horizontal position shown. The screws or bolts 17 may be made long enough to extend into the adjacent stall and hold another arm in place. This front stop-bar is placed far enough back to touch the withers of the cow when the cow is eating from the floor or from a low manger and to touch the lower part of the throat when the head is above the bar. Furthermore, this front stop-bar is placed far enough to the rear to render it necessary for the cow to swing her head to the right or to the left crosswise of the stall when changing from one position to the other. The adjustability of the stop-bar enables it to be secured in any position to suit any size of animal that is placed in the stall, limiting the range of the animal in the stall and the extent to which the animal's head can be lowered.

A lower floor-piece or threshold-strip 18ᵇ is secured transversely on the central portion of the floor of the stall directly under the stop-bar and serves to prevent the cow lying down too far forward, as if it were not present the cow would be liable to strike against the stop-bar when rising from a reposing position. The space which intervenes between the sides of the stall and the ends of the floor-piece or threshold-strip admits of the free forward action of the feet when the animal is reclining.

At the rear of the rear standards 13 and 13ª a releasing-bar 19 is hinged to the upper portions of the said standards, and when a series of stalls is employed this releasing-bar 19 is hinged to the rear standards 13 and 13ª of each of the stalls. In order that the releasing-bar may be readily raised, handles 20 in the form of cranks are attached at its ends. Opposite the rear end of each stall-body A a latch-bar 21 is hinged to the releasing-bar 19, and latch-fingers 22 are attached to the latch-bar, extending rearwardly therefrom. Each latch-finger 22 has its under edge inclined or curved upwardly and rearwardly, as shown at 23, from the latch-bar, with which the finger is connected, and in the under edge of each latch-finger 22 a recess 24 is produced near its connection with the releasing-bar.

In connection with each stall-body A, I employ a tilting frame B at the rear of the stall-body, and each tilting frame consists of side pieces 25, attached at their bottom edges by hinges 26 to the floor on which the stall is erected; but the upper edge of each side bar 25 of a tilting frame is downwardly beveled, and the beveled edges of the side bars are connected by an upper cross-bar 28. When the tilting frame is in position to close the rear of the stall, the recesses 24 in the latch-fingers 22 receive the upper edge of the upper cross-bar 28 of the tilting frame, and the lower end of the tilting frame is hinged far enough from the rear portion of the stall to make sure that when the frame is in its vertical position (shown by dotted lines in Fig. 2) the person who is to do the milking can enter, and when the frame is thrown back to the position shown in full lines in Fig. 2 an animal can freely enter and leave the stall.

In the further construction of the tilting frame B, I usually employ upper cross-braces 29 and 30 and an A-brace 31, as is shown in Fig. 1. Ordinarily below the ends of the A-brace 31 blocks 32 are secured to the inner faces of the side bars or members 25 of the tilting frame, the under edges of which blocks are inclined downward and forward to a greater or less extent. The tilting frame pivotally carries a swing-receptacle C, adapted to receive droppings. This receptacle comprises side pieces 33, connected at their upper ends by hinges 34 with the aforesaid blocks 32, so that when a tilting frame is carried to the full open position (shown in Fig. 2) the bottom of the receptacle C will rest upon the floor and will occupy an upright position; but as the receptacle C has a swing connection with the tilting frame B it occupies an upright position no matter in what position the tilting frame may be placed.

In the further construction of the receptacle C cleats 36 are secured to the inner faces of the side pieces at their bottom, and it may here be remarked that the lower portions 33ª of the side pieces are wider than the upper portions, as is clearly shown in Figs. 1 and 2.

A lower front cross-bar 37 is attached to the lower portions of the side pieces 33 of the receptacle C, and at the front upper portions of the lower wider sections 33ª of the side pieces a second cross-bar 38 is located, having an upper section inclined downward and rearward. The construction of the receptacle is completed by the addition of a back board 39 at the upper portion of the side pieces 33 and connecting them, and the forward edge of each side piece 33 is inclined downwardly and forwardly to the enlarged lower sections 33ª, as is best shown in Fig. 2, the rear edge 35 of the side pieces being inclined rearwardly and downwardly to the upper edge of the back board 39.

The lower portion of the receptacle C is adapted to receive a drawer 41, removable from the back, and this drawer is a receiver for the droppings and when removed can be readily emptied. A chute-board 42 is connected by hinges 43 at its lower side edges to the wider portions 33ª of the sides of the receptacle. This chute-board 42 when the tilting frame is closed rests upon the inclined surface of the front upper cross-bar of the receptacle, as is illustrated in Fig. 1. The upper portion of the said chute-board is preferably supported by cords, usually flexible cords or chains 44, attached thereto and to the side sections or members of the tilting frame. The cords 44 are attached to the tilting frame high enough so that the increasing distance as the tilting frame moves to an open position is great enough to draw the chute-board back out of the way. This board 42 when the tilting frame is closed falls against the cow's thighs no matter whether the cow moves forward or backward and serves to direct the droppings to the aforesaid drawer 41, but is restrained from falling too far forward or downward if a cow is not there by the aforesaid flexible cords 44, fastened to the top of either end of the chute-board and connected with the tilting frame, as specified. As the stall moves to the open position the distance between the top of the chute-board and the tilting frame increases, and the chute-board is thereby drawn back out of the way. The flexible cords 44 serve a dual purpose, as they also serve to draw the chute-board back out of the way when the stall is opened.

A perforated or reticulated frame 45 is hinged at its upper edge upon the upper face of the chute-board and is provided at its lower edge with legs 46, adapted to rest on the chute-board, and thus support the said reticulated or perforated frame 45 a suitable distance from the upper face of the chute-board. This frame 45 is a guard-frame, as its permits the droppings to pass through to an engagement with the upper face of the chute-board, but protects the tail of the cow from being soiled when brought in engagement with the receptacle C, as the tail will be held out of engagement with the said chute-board.

In order to facilitate the movement of the tilting frame B, a rope, chain, or cable 47 is attached to the central portion of the intermediate cross-bar 30 at the front, and this rope, chain, or cable is made to pass upwardly and rearwardly or forwardly, if desired, over the upper cross-bar 28 when the tilting frame is closed and is then passed over conveniently-arranged overhead pulleys 48 and is provided at its other end with a weight 49. Thus it will be observed when the tilting frame is released from engagement with its locking or latch fingers 22 the weight 49 will serve to carry the tilting frame to the vertical position shown by dotted lines in Fig. 2, and the said frame may then be easily forced rearward to the rearwardly-inclined position shown by full lines in Fig. 2, at which time the weight on the rope, chain, or cable 47 will not act, as the rope is pulling from a lower point of the frame when in such position than it does when the tilting frame is carried forward to close the stall. When it is desired to close the stall, it is simply necessary to give the tilting frame a slight forward movement, whereupon the action of the weight will tend to carry the frame to the vertical position, and a second forward movement will carry the tilting frame to a locking connection with the latch-fingers.

It will be understood that the weight on the rope or cable 47 does not act when the weight is not just more than sufficient to carry the tilting frame from its closed position when the rope is passing over the top of the frame. When the weight is only sufficient to carry the frame from the closed position by reason of the rope pulling from the top of the frame, it is of course insufficient to act upon the frame when pulling from the lower point of attachment to the frame, which latter action occurs when the frame is in its rearwardly-inclined position.

It will be observed that the latch mechanism is such that the latches connected with a series of stalls may be simultaneously disengaged from the tilting frames of all of the series by operating the releasing-bar 19 through the medium of the handles 20 and that any one tilting frame may be released to admit an animal or a milker to the stall by simply moving up the latch 21 belonging to that particular stall.

Having thus described my invention, I claim as new and desire to secure by Letters Patent—

1. In combination with a cow-stall, an adjustable front stop-bar arranged to restrain the forward movement of the cow by contact with the throat and withers.

2. In combination with the side sections of the body of a cow-stall, a stop-bar adjustably held between the said side sections at the front, and means for holding the stop-bar in adjusted position for engagement with the throat and withers of the animal, as described.

3. In a stall open at the front, carrying-beams normally in a horizontal position and adjustably connected with the sides of the stall, a stop-bar connecting the carrying-beams, and means for locking the carrying-beams in adjusted position, as described.

4. In a stall open at the front, carrying-beams adjustably and pivotally attached to the inner sides of the stall near the front, a stop-bar connecting the said carrying-beams, having a recess in one longitudinal edge, locking devices for the carrying-beams, and a centrally-located floor-stop, for the purposes decribed.

5. In combination with an upper stop-bar for the front of a stall, a floor-stop beneath the stop-bar, centrally located with reference to the sides of the stall, and stopping short of the said sides, as set forth.

6. In an open-front stall, a floor-stop located adjacent to the front of the stall, a space intervening the ends of the floor-stop and the sides of the stall sufficient to permit the forward passage of the forward limbs of an animal in reclining position, as set forth.

7. In a stall, a body-section, a tilting frame, a support for the same at the rear of the body of the stall, with which support the body portion of the tilting frame has hinge connection, the said tilting frame having movement to and from the said body of the stall, and a latch device carried by the body of the stall for engagement with the upper portion of the said tilting frame, as specified.

8. In a stall, a body-section, a tilting frame hinged to a support at the rear of the stall and capable of movement to and from the rear portion of the stall, a releasing-bar hinged to the rear portion of the body of the stall, a latch-bar hinged to the releasing-bar, and latch-fingers carried by the latch-bar, for engagement with the upper portion of the tilting frame, as specified.

9. In a stall, a body-section, a tilting frame hinged to a support independent of the stall and capable of movement to and from its rear end, a counterbalance device for the tilting frame, a releasing-bar hinged to the rear portion of the stall, a latch-bar hinged to the releasing-bar, and latch-fingers secured to the latch-bar, extending rearwardly therefrom and provided with upwardly-curved under edges and with recesses in said under edges to receive the upper portion of the tilting frame when in close relation to the stall, as specified.

10. In a stall, a body-section, a tilting frame located at the rear of the said stall, a latch device for the tilting frame, carried by the stall, and a receptacle for droppings, having pivotal connection with the said tilting frame, as described.

11. In a stall, a body-section, a tilting frame located at the rear of the said stall, a latch device for the tilting frame carried by the stall, a receptacle for droppings, having pivotal connection with the said tilting frame, a removable drawer carried by the said receptacle, a chute-board pivotally attached to the forward portion of the receptacle, and means for limiting the downward movement of the said chute-board, the said chute-board having free movement to and from the forward edges of the said receptacle, as described.

12. In a stall, a body-section, a tilting frame located at the rear of the said stall, a latch device for the tilting frame carried by the stall, a receptacle for droppings having pivotal connection with the said tilting frame, a removable drawer carried by the said receptacle, a chute-board pivotally attached to the forward portion of the receptacle, means for limiting the downward movement of the said chute-board, said chute-board having free movement to and from the forward edges of said receptacle, and a perforated or reticulated guard connected with the upper face of the chute-board, being held out of engagement with the said chute-board beyond its point of attachment therewith, as described.

13. The combination with a stall of a tilting frame pivoted to a support, having movement to and from the rear of the stall, a releasing-bar hinged to the rear portion of the stall, a latch-bar hinged to the releasing-bar, latch-fingers carried by the latch-bar, having recesses in their under edges, and an inclined cross-bar at the upper portion of the tilting frame, adapted to enter the recesses in the latch-fingers when the tilting frame is in closed relation with reference to the stall, as described.

14. The combination with a stall, of a tilting frame pivoted to a support, having movement to and from the rear of the stall, a releasing-bar hinged to the rear portion of the stall, a latch-bar hinged to the releasing-bar, latch-fingers carried by the latch-bar, having recesses in their under edges, an inclined cross-bar at the upper portion of the tilting frame, adapted to enter the recesses in the latch-fingers when the tilting frame is in closed relation with reference to the stall, a rope, chain or cable attached at one of its ends to the forward central portion of the tilting frame at its upper part, a weight at the opposite end of the said rope, chain or cable, and roller-supports for the said rope, chain or cable, connected with the tilting frame, for the purposes set forth.

15. In a stall, the combination with the body thereof, of a tilting frame having swinging movement to and from the rear portion of the stall, a receptacle for droppings, having pivotal connection with the said tilting frame, a chute-board pivotally attached to the forward portion of the receptacle and adapted to automatically engage with the animal in the stall, irrespective of the movement of the animal, substantially as described.

16. In a stall, the combination with the body thereof, of a tilting frame having swinging movement to and from the rear portion of the stall, a receptacle for droppings having a pivotal connection with the said tilting frame, a chute-board pivotally attached to the forward portion of the receptacle and adapted to automatically engage with the animal in the stall, irrespective of the movement of the animal, and a reticulated or perforated tail-guard hinged at its upper portion to the upper face of the chute-board and provided with legs at its inner rear portion for engagement with the chute-board, whereby to elevate the said guard from the receiving-face of the chute-board, as set forth.

17. In a cow-stall, a tilting frame, movable to and from the body of the stall, a support upon which the bottom of the frame is hinged, a chute-board for droppings carried by the tilting frame, and a flexible support between the chute-board and tilting frame, so located that the chute-board is carried to and from the body of the stall as the tilting frame moves in corresponding directions, and whereby the chute-board is permitted to drop a predetermined distance only, and when the tilting frame is in closed position the said chute-board engages with the thighs of the cow in the stall, as described.

18. In a cow-stall, the combination of the body of the stall, a tilting frame movable to and from the rear end of the stall, a support to which the bottom of the frame is hinged, a receptacle for droppings, carried by the said tilting frame, a chute-board also carried by the tilting frame, having a normal inclination in direction of the said receptacle, and flexible cords connecting the upper portion of the chute-board with the said tilting frame, as described.

19. In a stall, a body-section, a tilting frame movable to and from the entrance of the stall to open and close the same, and weighted cords attached to the said tilting frame, assisting in the movement of the frame, latch devices for the frame, and releasing devices for the latch devices.

20. A stall, a frame mounted for movement to and from the entrance to the stall, a carrier pivoted to the frame, a removable receptacle in the carrier, a chute-board pivoted to the carrier, a tail-guard on the chute-board, and flexible connections between the frame and the chute-board, adapted to carry the board back out of the way when the stall is opened by reason of the distance increasing when the frame is moved to the open position, as shown.

In testimony whereof I have signed my name to this specification in the presence of two subscribing witnesses.

WILLIAM MOTT UNDERHILL.

Witnesses:
R. A. MINIELY,
HENRY TIEGS.